United States Patent

[11] 3,575,131

| [72] | Inventor | Larry John Lohmann |
| | | Toledo, Ohio |
| [21] | Appl. No. | 727,605 |
| [22] | Filed | May 8, 1968 |
| [45] | Patented | Apr. 13, 1971 |
| [73] | Assignee | Owens-Illinois, Inc. |

[54] APPARATUS FOR APPLYING BONDING MATERIAL TO ANNULAR SEALING SURFACES
10 Claims, 7 Drawing Figs.

[52] U.S. Cl. ..................................................... 118/8,
118/9, 118/321
[51] Int. Cl. ........................................................ B05c 5/00
[50] Field of Search ........................................ 118/8, 320,
321, 409, 9

[56] References Cited
UNITED STATES PATENTS

| 2,880,697 | 4/1959 | Blanding et al. ............... | 118/8X |
| 2,960,060 | 11/1960 | Chatterton .................... | (118/8UX) |
| 2,976,837 | 3/1961 | Glaus ............................ | 118/320X |
| 3,342,158 | 9/1967 | Bennett et al. ................. | 118/321X |
| 3,391,671 | 7/1968 | Windsor ....................... | 118/321X |
| 3,403,658 | 10/1968 | Damm et al. .................. | 118/409X |
| 3,408,979 | 11/1968 | Torwegge ..................... | 118/8 |

*Primary Examiner*—John P. McIntosh
*Attorneys*—W. A. Schaich and E. J. Holler

ABSTRACT: Coating apparatus for applying a uniform layer of extrudable bonding material onto an annular sealing surface of a hollow, glass part of the type suitable for fabricating cathode-ray, picture tube, envelopes. The layer is applied at a constant weight per lineal dimension in precisely centered location by minimized delivery nozzle movement during dispensing of the bonding material onto a nonsymmetrical sealing edge surface.

Patented April 13, 1971

INVENTOR.
LARRY J. LOHMANN
BY W. A. Schaich &
E. J. Holler
ATTORNEYS

INVENTOR.
LARRY J. LOHMANN
BY
ATTORNEYS

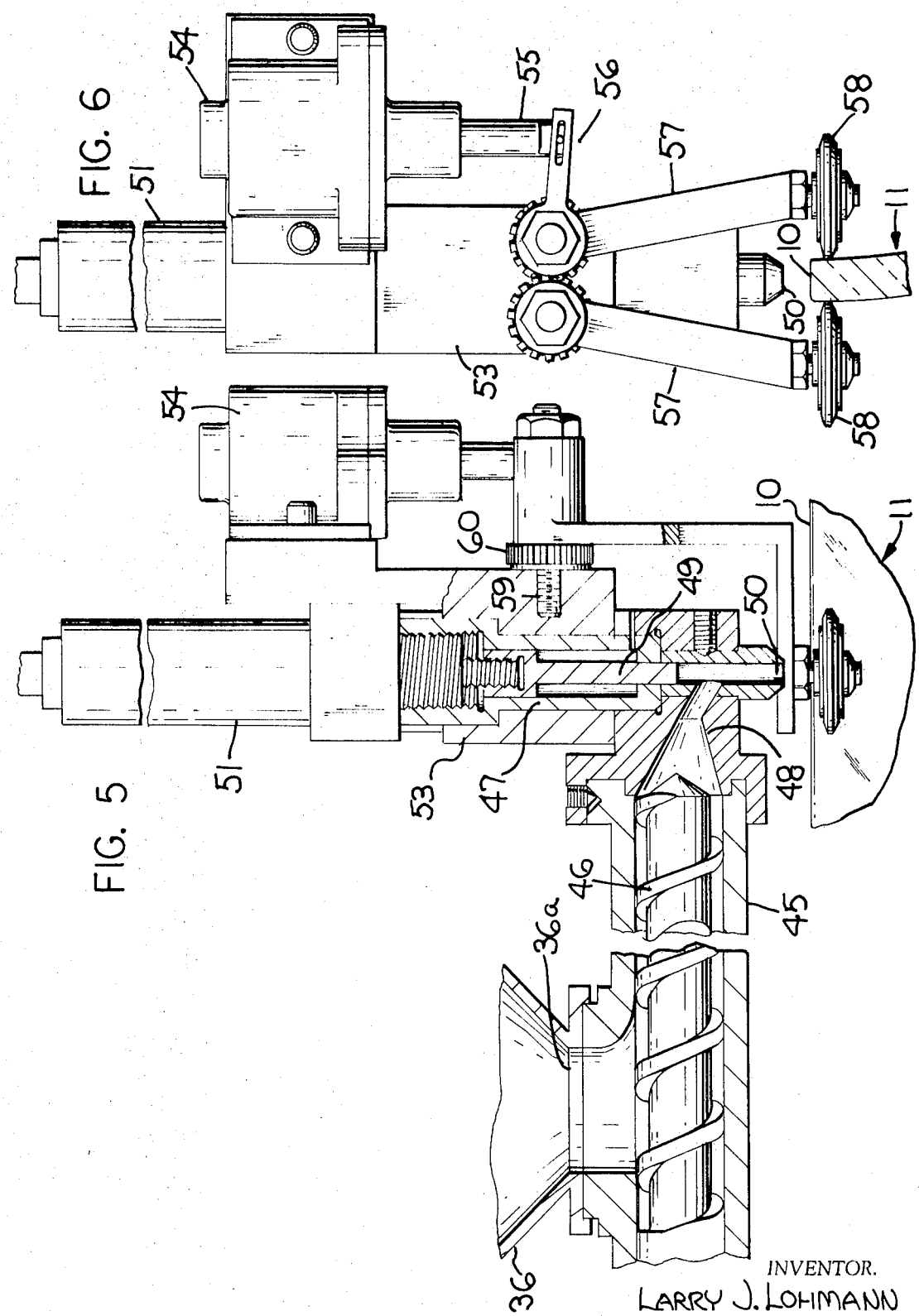

3,575,131

APPARATUS FOR APPLYING BONDING MATERIAL TO ANNULAR SEALING SURFACES

BACKGROUND OF THE INVENTION

This invention relates to apparatus for applying bonding material to sealing surfaces, and more particularly to the application of a particulate solder glass in extrudable form to an annular sealing surface of a hollow glass part such as the funnel member of a rectangular, color television, picture tube envelope. Normally, in fabricating an essentially all-glass cathode-ray tube envelope, only one of the sealing surfaces of the component hollow glass parts having complementary or mating sealing surfaces, i.e., faceplate and funnel members, is coated with such sealant. The sealing surfaces are then subsequently brought into close proximity in precise alignment and fusion sealed into a hermetic joint by means of the particulate solder glass.

The problems involved in applying solder glass frit, or the like, to an annular sealing edge surface of a TV funnel, for example, have been especially vexatious where variations in the amount of sealant deposited per unit length on the seal edge as a coating can and does occur. Such nonuniformity results in undue seal edge stresses and/or weaknesses which cannot be tolerated in fully fabricated, cathode-ray, picture tubes such as those employed in the field of color television reception. Normally, the sealant, as applied to the annular sealing edge, consists of a thermal-sealing, solder glass which is suspended in particulate form in a viscous suspension with an organic vehicle to facilitate its uniform application to the sealing surface in desired form. The viscous suspension, or frit bead, is thus in a form suitable to be applied to the sealing surface in ribbon form in a manner similar to toothpaste. Previous practice has consisted of forcing the suspension or paste through an orifice using positive air pressure to dispense the paste onto the sealing surface. Such application is extremely sensitive to variations in paste viscosity which occur during conventional dispensing.

After the sealant is applied to the annular sealing surface, it is conventionally allowed to air dry and the component part is then placed in a fixture along with the complementary hollow glass part, such as the faceplate, to form a hermetic seal utilizing a thermal-sealing process which normally attains a sealing temperature of about 425 to 450° C. During the sealing process, the solder glass is normally crystallized into an essentially nonvitreous glass-ceramic to form a durable hermetic joint. The completed solder glass seal must be capable of withstanding a 35,000 volt test, for example, to ensure proper dielectric strength during tube life.

Heretofore, the prior art has utilized coating apparatus such as that disclosed in U.S. Pat. No. 2,880,697, issued to Blanding and Zimar on Apr. 7, 1959, wherein the supported article is mounted for rotation about its vertical axis in such manner that rotation of the article progressively passes the surface to be coated under an orifice which delivers a stream of the sealant in the form of a viscous suspension. Inherent difficulties result from the use of such apparatus since the delivered stream of sealant may vary in viscosity and since the resultant amount of sealant applied per lineal dimension of the sealing surface may vary considerably. Where the discharge orifice, which is conventionally located at the bottom of a container for retaining the bonding material, is permitted to oscillate widely through a substantial horizontal distance upon delivery of the sealant onto the article seal edge, wide variation in the amount of delivered sealant per unit length results. Further, the accuracy of such apparatus, which simply discharges the solder glass through the bottom outlet of the bonding material container during its widely swinging oscillation in attempting to follow the nonsymmetrical seal edge surface in the case of a rectangular funnel, is very dependent upon the sealant having a constant viscosity. Attendantly, because of such swinging movement considerable difficulty is encountered in precisely following the seal edge which results in offcenter application of the sealant and consequent runoff of the sealant down the workpiece sides which cannot be tolerated in producing high-quality tubes. This is particularly true where the discharge orifice is capable of following only the exterior sidewall of the workpiece adjacent a seal edge of varying width.

Accordingly, it is an object of the present invention to provide coating apparatus which is capable of dispensing a constant weight bead of extrudable bonding material onto a sealing edge surface, regardless of minor variations in the bonding material viscosity.

It is a further object of this invention to provide apparatus which includes improved tracking mechanism which ensures that the bead which is dispensed onto the sealing surface follows the centerline thereof, regardless of its width or contour, and which reduces or eliminates runoff of sealant over the sides of the sealing edge.

Another object of this invention is to provide coating apparatus which is adapted to pass an annular sealing edge of a nonsymmetrical hollow glass article at substantially constant lineal velocity past a substantially fixed point of delivery of the bonding material to promote uniform application of the bonding material regardless of sealing surface width, contour and/or dimensions.

A still further object of the present invention is to provide apparatus which will apply a stable, uniform layer of bonding material onto a substantially planar, nonsymmetrical, sealing edge surface by means of a positive metering screw which extrudes the bonding material through an orifice in such manner as to provide constant output while compensating for greater viscosity variations in the bonding material. The apparatus provides coaxial alignment for centering of the beadlike coating on the sealing edge, with minimal movement of the delivery orifice, reduces runoff over the seal edge and compensates for seal width variation.

Other objects and advantages of this invention will become apparent to those skilled in the art from the following detailed description, taken in conjunction with the annexed sheets of drawings on which, by way of preferred example only, are shown a preferred embodiment of the invention.

On the accompanying drawings:

FIG. 5 is an enlarged vertical and partly sectional view of the extruder and the delivery head mechanism of the apparatus.

FIG. 6 is an end view of the extruder and delivery head mechanism shown in FIG. 5.

Figure 1:
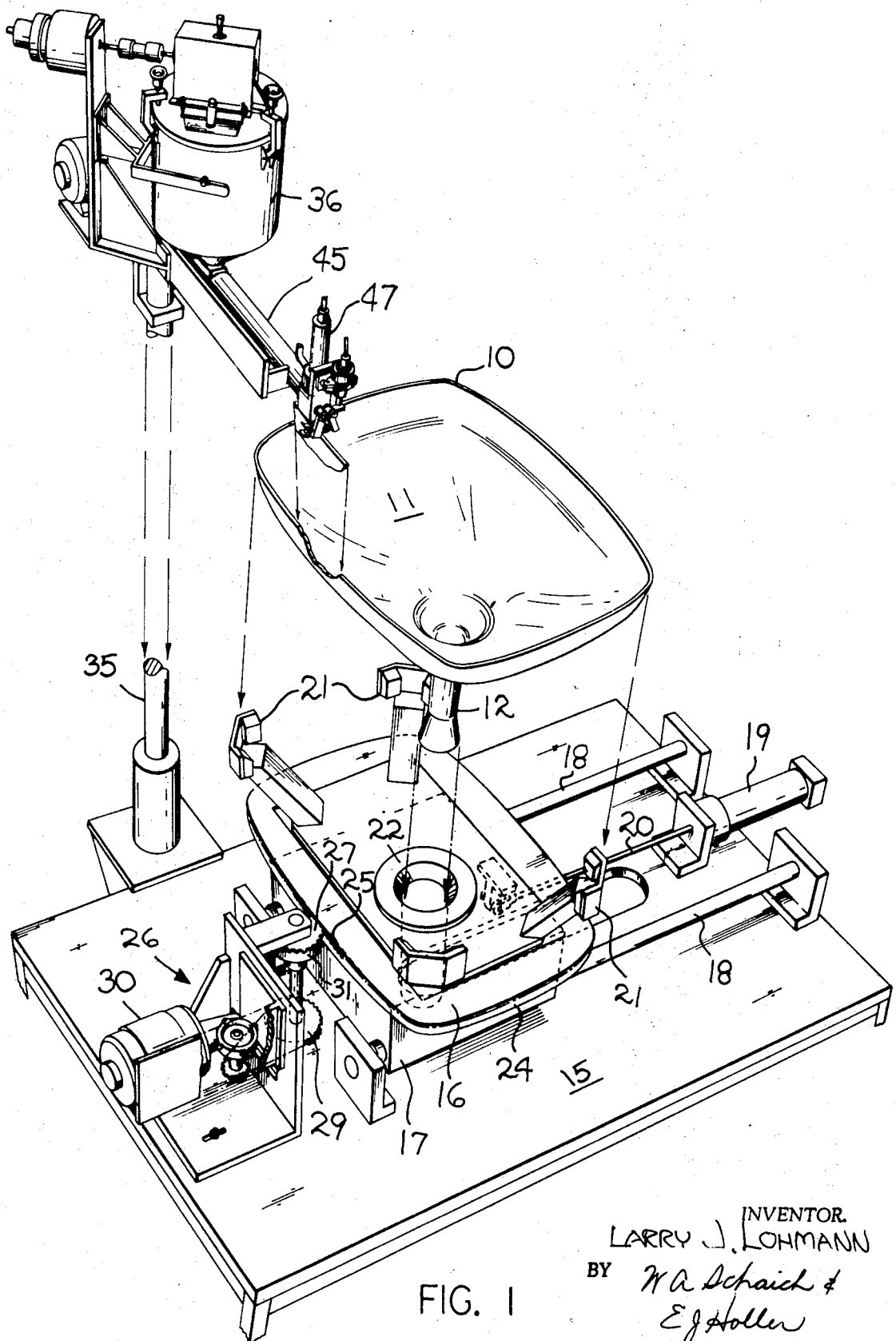
FIG. 1 is an exploded perspective view of the coating apparatus; a cathode-ray tube funnel member being shown having a generally rectangular sealing edge surface on which the solder glass coating is applied.

Referring to FIG. 1, the apparatus embodying the invention is adapted to apply an endless layer, or bead, of bonding material such as solder glass frit on the annular sealing surface 10 of a large hollow glass part such as a cathode-ray tube funnel member 11. Sealing edge or sealing surface 10, is normally planar and nonsymmetrical, having a generally rectangular configuration in the case of a rectangular picture tube envelope, although it may also be circular and symmetrical in the case of a circular tube envelope. The workpiece may also consist of the faceplate member, or panel, (not shown) of the cathode-ray tube envelope which has a seal edge complemental to funnel-sealing surface 10. Funnel member 11 is normally frustopyramidal in shape having a cylindrical neck tubulation 12 extending from its small end in axial alignment with the central axis of the body portion.

Referring to FIG. 1, the apparatus includes a table 15 having mounted thereon a rotatable article holder 16 which is laterally movable. Article holder 16 is mounted on a carriage 17 which in turn is slidable on a pair of horizontal rods 18, fixedly secured in parallel horizontal relation on the table. Article holder 16 is rotatably mounted in suitable bearings contained within carriage 17. A pneumatic motor, such as air piston motor 19, is mounted on the table intermediate rods 18, with its piston rod 20 interconnected to one side of carriage 17. Thus, air piston motor 19 and its piston rod 20 are able to move the article holder and supported workpiece laterally into and out of rotative relation.

Funnel 11 is supported within the article holder 16 by means of four upwardly and outwardly extending support blocks 21, which positively engage the exterior surfaces of the funnel corner portions. Cushioning pads such as blocks of thermoplastic material may be positioned within each of the corner retention members 21. Article holder 16 has a circular apertured member 22 located at its central lower portion adapted to receive and retain the neck portion 12 of the workpiece in vertical alignment. Thus, the combination of corner pads and circular neck retention members are able to positively restrain funnel 11 with its axis in vertical alignment and its sealing surface 10 in a precise horizontal plane.

Figure 2:
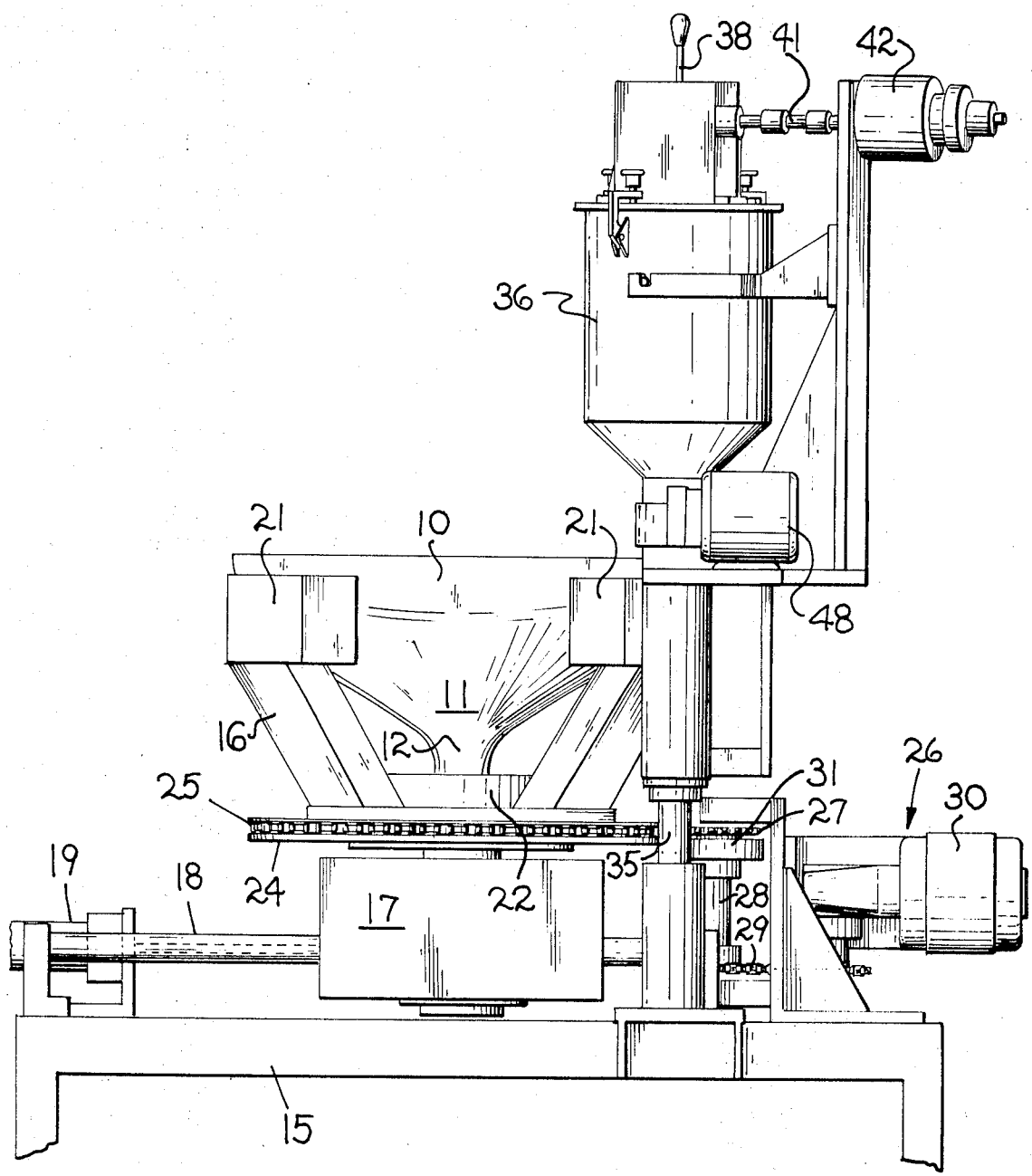
FIG. 2 is a side elevational view of the coating apparatus embodying this invention.

An endless cam 24 is mounted at a lower region of article holder 16 having a contour substantially similar to the configuration of sealing surface 10. Thus, as shown in FIGS. 1 and 2, cam 24 has dimensions which are slightly less than sealing surface 10 but a precisely similar rectangular configuration. Immediately above cam 24 is mounted an endless driving chain 25 having a contour and dimensions similar to the periphery of cam 24, such endless chain being utilized to rotate the workpiece at constant linear velocity.

The driving assembly 26 for article holder 16 is mounted on the opposite side of the table from pneumatic motor 19. A driving gear or sprocket 27 having gear teeth spaced complemental to endless driving chain 25 is mounted in the same vertical attitude as the chain. A short stub shaft 28 interconnects driving gear 27 to a lower driving sprocket 29 which in turn is driven by a constant-speed electrical motor 30. Electric motor 30 operates through a suitable gear reduction box and an endless chain to operate drive sprocket 29. A cam follower 31 mounted on the stub shaft 28 immediately below driving gear 27 is adapted to contact and follow contoured cam 24 of the work holder. Thus, pneumatic motor 19 is adapted to move endless rectangularly shaped cam 24 of the article holder against cam follower 31, at which time driving gear 27 interconnects with endless drive chain 25 on the article holder for rotating the workpiece and moving the annular sealing surface at constant velocity past a substantially fixed point of delivery of the bonding material immediately thereabove.

Figure 4:
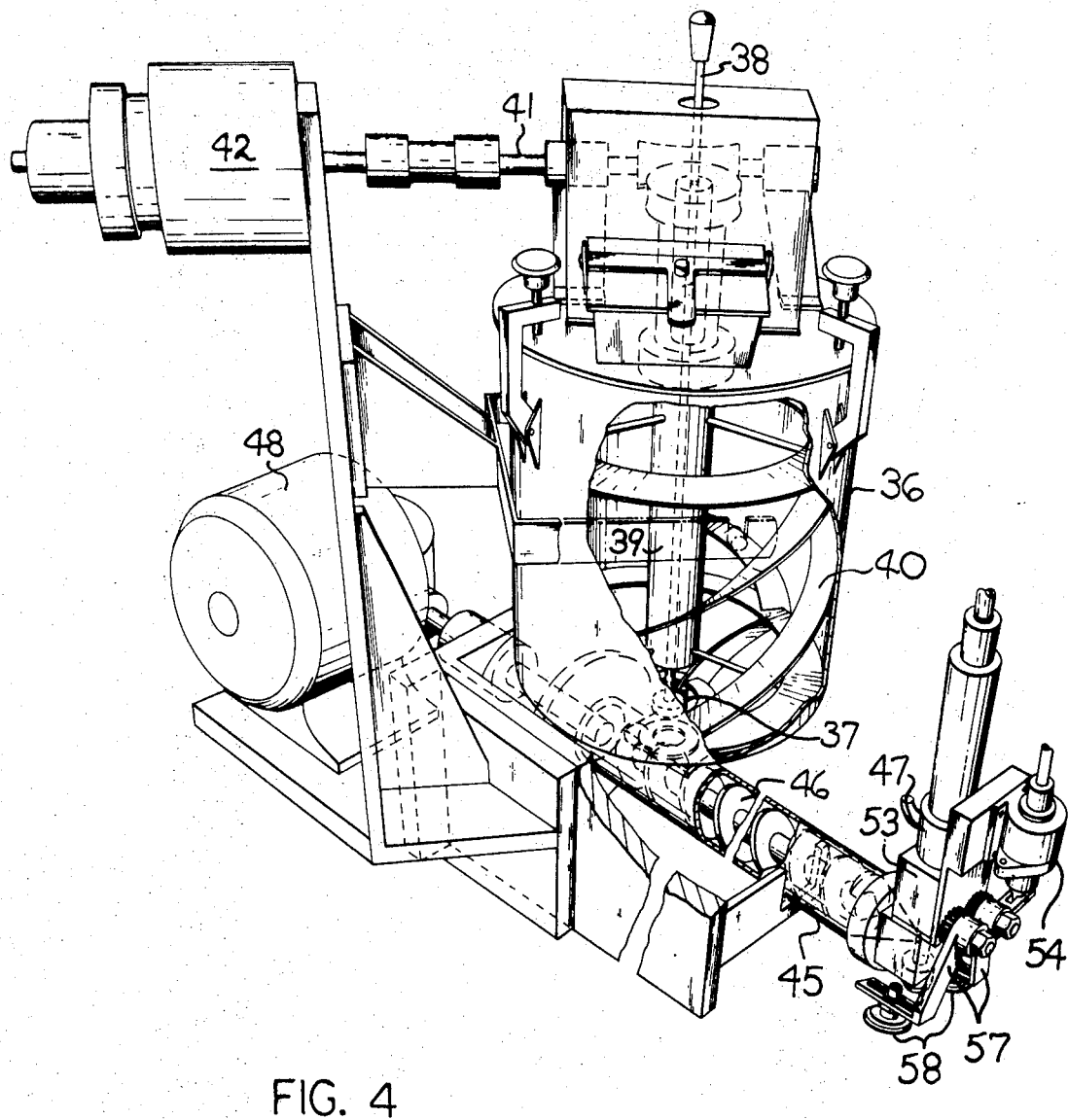
FIG. 4 is a perspective view of the bonding material container and delivery extruder with sidewall portions cut away to show their interior construction.

A vertical upwardly extending column 35 is mounted at one side of the table. A solder glass storage container 36 is mounted on the upper end of vertical column 35 in pivotal relation. Container 36 is preferably cylindrical in shape having a frustoconical shaped bottom and central outlet 36a adapted to be opened or closed by a bottom valve 37 interconnected to a long shaft or spindle 38. Surrounding central shaft 38 is a stirrer shaft 39 on which is mounted a set of helical vanes or blades 40, as shown in FIG. 4, adapted to continuously and thoroughly intermix the viscous suspension of the particulate solder glass and the liquid organic vehicle. Stirrer shaft 39 is interconnected to drive shaft 41 of constant-speed air motor 42 for continuously agitating the viscous suspension contained within receptacle 36.

Figure 3:
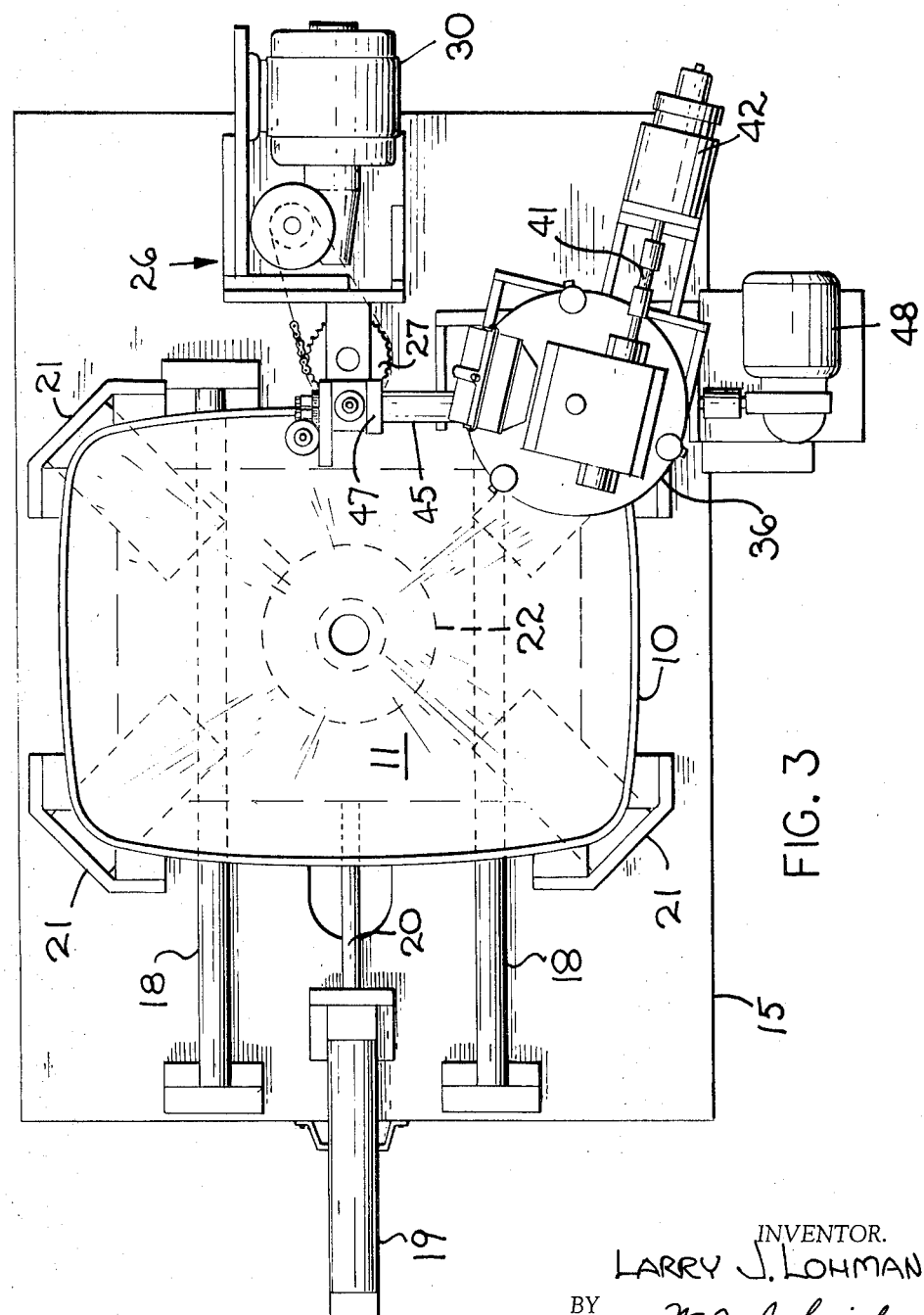
FIG. 3 is a plan view of the coating apparatus.

Referring to FIGS. 3 and 4, a screw thread extruder 45 is mounted to interconnect with the bottom outlet 36a of container 36. Extruder 45 comprises a cylindrical barrel having a closely fitting rotary screw 46 mounted therewithin adapted to positively deliver the viscous suspension of solder glass to a delivery head 47. A constant speed motor 48 interconnects with the screw member 46 to continuously deliver the solder glass into the delivery head when the screw 46 is operated. FIG. 4 shows the interior of the storage and intermixing container 36 for the solder glass and its interconnection to the horizontally aligned screw extruder adapted to deliver the solder glass to a substantially fixed point of delivery beneath delivery head 47. The axis of the extruder and the workpiece radius form a substantial right angle at the point of delivery over the seal edge surface.

As shown in FIG. 5 in considerable detail, the bottom outlet 36a of the storage container interconnects with the inlet end of screw extruder 45. Rotary screw 46 is adapted to closely seat in rotary relation within the cylindrical barrel of the extruder to advance the viscous solder glass into delivery head 47. Head 47 has a laterally and vertically extending passage 48, the vertical extent having a valve-operated needle or spindle member 49 mounted therein for controlling the opening and closing of delivery orifice 50. Needle 49 is operated by a pneumatic valve 51 into and out of the orifice to control to the stoppage and initiation of solder glass flow.

A cylindrical sleeve member 53 is mounted on delivery head 47 in rotatable relation to carry follower elements adapted to retain and positively position delivery orifice 50 over the centerline of the workpiece-sealing edge. A pneumatic valve 54 is mounted on cylindrical sleeve member 53, its piston rod 55 being pivotally connected to a lever arm 56 for its angular rotation. A pair of similar arms 57 each carrying a follower roller 58 is mounted in pivotal relation on stud shafts 59, each arm having a gear tooth sprocket fixed to its mounting shaft with the two sprockets interconnecting for equiangular movement of the two arms 57 upon rotation of arm 56. Thus, when piston rod 55 is extended downwardly, the pair of arms 57 move together to bring follower rollers 58 into contact with opposing surfaces of the workpiece sidewall. Such movement centers the delivery orifice 50 over the seal edge.

Figure 7:
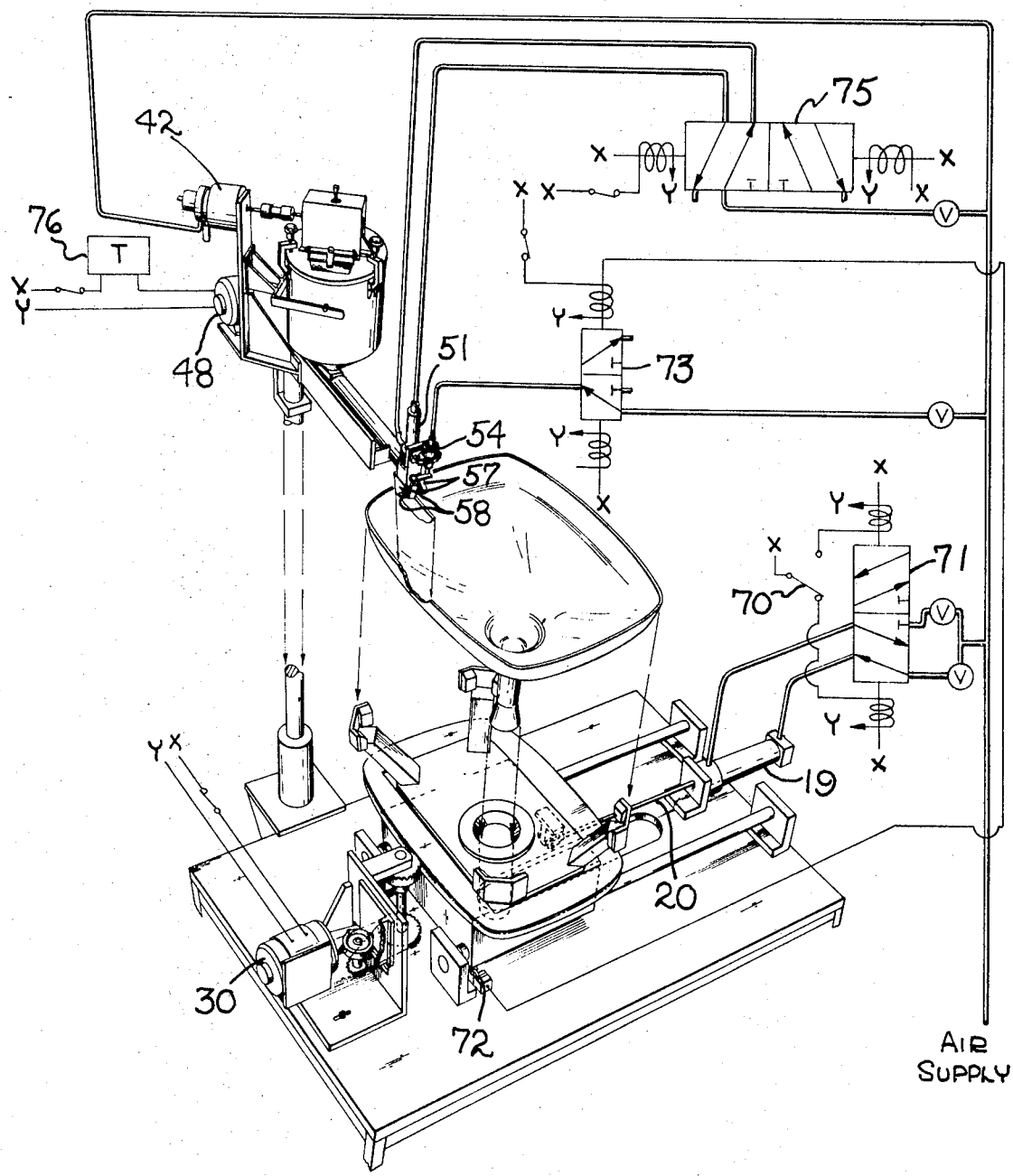
FIG. 7 is a simplified schematic diagram of the pneumatic and electrical circuitry of the apparatus.

Referring to FIG. 7, the schematic, pneumatic and electrical circuitry for the apparatus comprises a pushbutton 70 which is momentarily depressed at the start of the cycle after the workpiece 11 has been placed in the article holder and the solder glass is contained within at least the lower extremity of storage chamber 36 and screw extruder 45. When the pushbutton 70 is depressed, it actuates pneumatic valve 71 which shifts to extend piston rod 20 of pneumatic motor 19 which in turn advances the funnel and article holder forwardly, right to left as shown in FIG. 1, against cam follower 31 so that driving gear 27 interengages with endless drive chain 25. When carriage 17 of the article holder reaches cam follower 31, limit switch 72 is tripped by the carriage. A second pneumatic valve 73 shifts to extend the piston rod 55 of single-acting cylinder 54 which piston rod thereby moves downwardly to engage the pair of follower rollers 58 with the opposing side surfaces of the seal edge. The work holder 16 is then rotated by energizing drive motor 30 so that through the associated power train driving gear 27 rotates the workpiece with a localized area of the seal edge in a substantially fixed position beneath the nozzle orifice 50 for solder glass delivery. Pneumatic valve 75 shifts to retract upwardly the piston rod of air cylinder 51 to open delivery nozzle 50 to facilitate discharge of the solder glass. Feed screw drive motor 48 is simultaneously energized to start dispensing the solder glass onto the seal edge surface through the open passage to delivery orifice 50. A uniform stream of the solder glass is delivered from the delivery orifice 50 which is maintained in precise coaxial alignment with the seal edge during its rotation, regardless of its width or contour. When the material has been dispensed around the entire seal edge surface, the screw feed motor 48 stops rotating, the duration of its operation being controlled by an electrical timer 76. Pneumatic valve 75 then shifts to its original position to extend the spindle 49 of cylinder 51 into discharge nozzle 50 thereby terminating delivery of the solder glass onto the seal edge. The article holder drive motor 30 is then deenergized, stopping funnel rotation. Pneumatic valve 73 then shifts to its original position allowing piston rod 55 to retract upwardly, which disengages follower rollers 58 from the workpiece. Pneumatic valve 71 then shifts to its original position to retract piston rod 20 to return the article holder carrying the workpiece to its original starting position for unloading the workpiece.

As stated, the present apparatus is capable of applying a low-melting thermal sealing solder glass, in paste form, onto an annular seal edge with greater precision. An example of such material is Owens-Illinois' Product No. CV–130 disposed within a liquid vehicle such as amyl acetate in nitrocellulose. The apparatus is fully capable of dispensing a wider range of solder glass-to-vehicle ratio material over a longer period of time than any air-pressure-type apparatus used previously. The present apparatus maintains substantially constant the amount of dispensed material within about 6 percent over a solder glass-to-vehicle ratio range of 10.5:1 to 13.5:1. It has been found that the bonding material may remain in the storage chamber for a considerable period of time, for up to 16 hours, following which dispensing by means of a screw extruder may be resumed. In one test period, dispensing of the bonding material differed by only 1 percent from that obtainable before the storage period.

The subject apparatus is especially significant for delivering a substantially constant output of bonding material over a wide range of solder glass-to-vehicle ratio. The apparatus is of special value for reducing the criticality of bonding material viscosity to permit delivery of a desired uniform bead shape over the seal edge while maintaining a constant material weight per unit length, or alternatively per workpiece.

The apparatus provides a constant linear velocity of the seal edge passage under the orifice through 360° of workpiece rotation, using the two opposed rollers—one on each side of the seal edge surface—which permit precise tracking about the dispensing orifice centerline. The axis of the discharge orifice is maintained on the centerline of the sealing surface throughout complete rotation of the workpiece, even around the short radius corners of a rectangular funnel. Such follower wheels provide accurate tracking for centering of the bead on the seal edge, reduces runoff over the seal edge, and compensates for sealing surface width variations. The use of a positive metering screw to extrude the solder glass frit onto the sealing glass surface provides uniform delivery of the frit through widespread viscosity variations. The use of a positive shutoff spindle in the delivery head eliminates frit dripping from the orifice and wastage of the material between application cycles. Further, the essentially closed container and delivery system and for the frit eliminates evaporation of the frit vehicle and thereby reduces rapid viscosity changes.

Various modifications may be resorted to in the spirit and scope of the appended claims.

I claim:

1. In an apparatus for applying a uniform coating of extrudable bonding material to to a nonsymmetrical annular sealing edge surface of a hollow article such as a rectangular funnel member of a color TV picture tube envelope an the like, the combination comprising:
    a table;
    rotatable article support means mounted on said table adapted to retain said article with its sealing edge surface in substantially horizontal upwardly facing relation;
    means for simultaneously moving said article support means rotationally and laterally to rotate the article and progressively present a localized area of said sealing edge surface at constant velocity to a substantially fixed point of delivery of said bonding material;
    a container for retaining said extrudable bonding material mounted in pivotal relation above and adjacent said point of delivery of said bonding material;
    a screw extruder connected to the lower extremity of said container extending to said point of delivery of said bonding material;
    means for rotating the screw member of said screw extruder;
    a delivery head having a bottom orifice mounted on the discharge end of said screw extruder;
    means for positively aligning the delivery head orifice with said sealing edge surface throughout its constant velocity passage therebeneath during rotation of said article; and
    timing means for controlling the delivery of said bonding material onto said sealing edge surface.

2. The combination set forth in claim 1, including valve means operated by said timing means for positively controlling the delivery of said extrudable bonding material from the bottom orifice of said delivery head.

3. The combination set forth in claim 1, wherein said means for rotating said article support means and said substantially fixed point of delivery of said bonding material are in substantially vertical alignment.

4. The combination set forth in claim 1, wherein the axis of said screw extruder and the radius of the supported article to the be coated intersect substantially at a right angle and at the fixed point of delivery of said bonding material.

5. The combination set forth in claim 1, wherein said means for positively aligning the delivery head orifice with said sealing edge surface comprises a pair of juxtaposed freely rotatable rollers mounted in spring-biased pivoted relation on said delivery head adapted to contact opposing surfaces of the sealing edge sidewall for precise coaxial alignment of said sealing surface and delivery orifice throughout rotation of the article.

6. The combination set forth in claim 1, wherein said means for rotating the screw member of said screw extruder comprises a constant-speed electric motor.

7. The combination set forth in claim 1, wherein:
    said rotatable article support means comprises a rotary article holder having an endless cam mounted therearound, said cam having a contour similar to said article-sealing surface;
    a rotary cam follower and driving gear adapted to contact and engage said endless cam and the complemental periphery of said holder respectively in vertical alignment with said fixed point of delivery of said bonding material;
    pneumatic means for moving said holder laterally and am maintaining the same against said cam follower and driving gear; and
    motor means for rotating said driving gear to rotate said article holder at constant velocity for uniform delivery of said extrudable bonding material from said delivery head onto said coaxially aligned sealing surface.

8. In an apparatus for applying a uniform coating of extrudable bonding material in an endless path on an annular sealing edge surface of a hollow article, the combination comprising:
    a table;
    a rotatable article holder mounted in slidable relation on said table adapted to retain said article to be coated with its sealing edge surface in substantially horizontal upwardly facing relation;
    pneumatic means for laterally moving said article holder to bring a localized area of the sealing surface of a supported article to a substantially fixed point of delve delivery of said bonding material;
    means for rotating the article holder to progressively present a localize area of the sealing surface to said fixed point of delivery of said bonding material;
    a container for retaining said extrudable material mounted in pivotal relation above and adjacent said point of delivery of said bonding material;
        a screw extruder connected to the lower extremity of said container extending to said point of delivery of said bonding material, the axis of said screw extruder intersecting the article radius substantially at a right angle at said fixed point of delivery;
    means for rotating the feed screw member of said screw extruder;
    a delivery head having a bottom orifice mounted on the discharge end of said screw extruder;

follower means mounted on said delivery head adapted to contact juxtaposed surfaces of the sealing edge sidewall closely adjacent said fixed point of delivery of said bonding material to positively align the delivery head orifice and the sealing edge surface of the article to be coated; and timing means adapted to control the delivery of said bonding material onto said sealing edge surface.

9. The combination set forth in claim 8, wherein:

said pneumatic means for laterally moving said article holder comprises an air piston motor;

said means for rotating said article holder comprises a driving gear adapted to engage a driving chain mounted around said article holder in a contour complemental to said annular sealing edge, and an electric motor adapted to drive said driving gear.

10. The combination set forth in claim 8, wherein:

said means for rotating the feed screw member of said screw extruder comprises a constant-speed electric motor;

said follower means mounted on said delivery head comprises a pair of juxtaposed rollers mounted in pivotal spring-biased relation adapted to contact opposite surfaces of the sealing edge sidewall; and valve means mounted within the bottom orifice of said delivery head operable by said timing means to control the delivery of said bonding material onto said sealing edge.

UNITED STATES PATENT AND TRADEMARK OFFICE
CERTIFICATE OF CORRECTION

PATENT NO. : 3,575,131
DATED : April 13, 1971
INVENTOR(S) : L. J. Lohmann

It is certified that error appears in the above-identified patent and that said Letters Patent are hereby corrected as shown below:

Col. 3, line 7, after "as" insert --an--. Col. 4, line 18, after "control" delete "to". Col. 5, line 55, after "material" delete "to" (first occurrence); line 57, change "an" to --and--. Col. 6, line 41, after "and" delete "am"; line 59, after "of" (first occurrence) delete "delve"; line 62, change "localize" to --localized--.

Signed and Sealed this

Fifth Day of April

[SEAL]

Attest:

RUTH C. MASON
Attesting Officer

C. MARSHALL DANN
Commissioner of Patents and Trademarks